Jan. 20, 1953 J. T. ANTLE, JR 2,626,001
HYDRAULIC DRIVE FOR MOTOR VEHICLES
Filed Feb. 9, 1949 2 SHEETS—SHEET 1
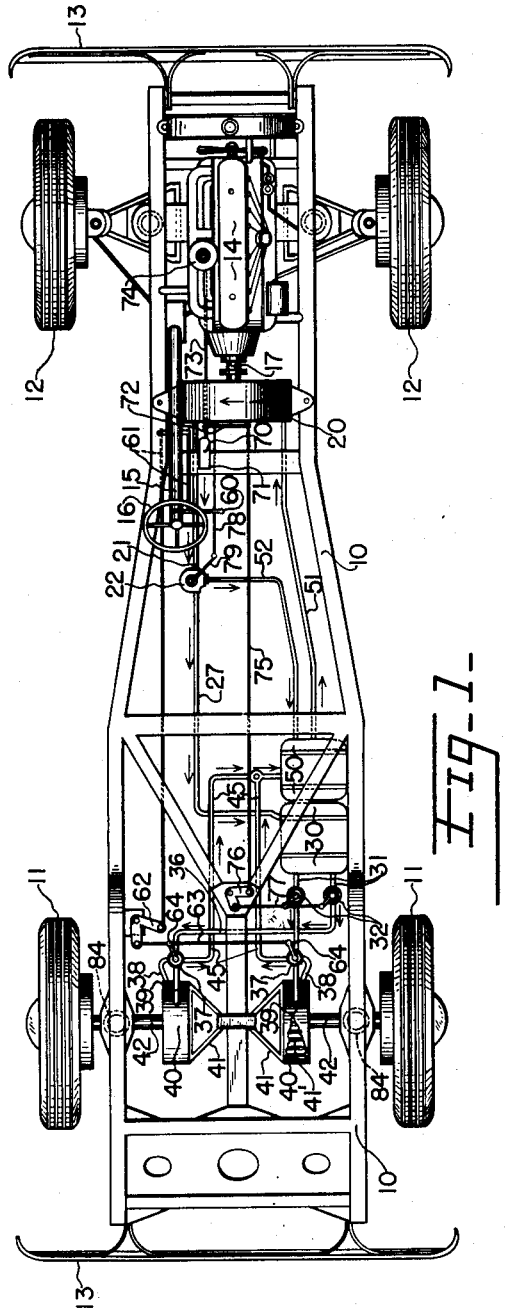
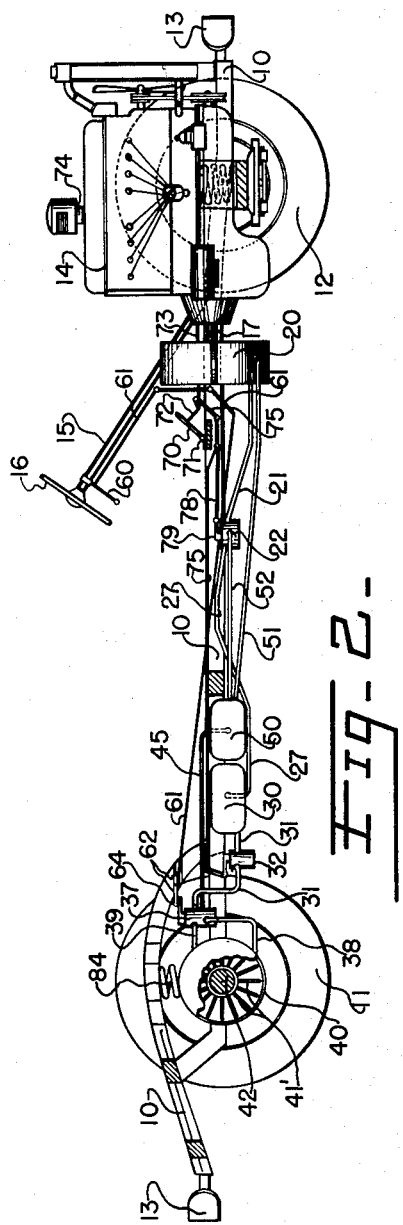
Inventor.
JOHN T. ANTLE, JR.
By Harvey O'Connell
Attorneys.

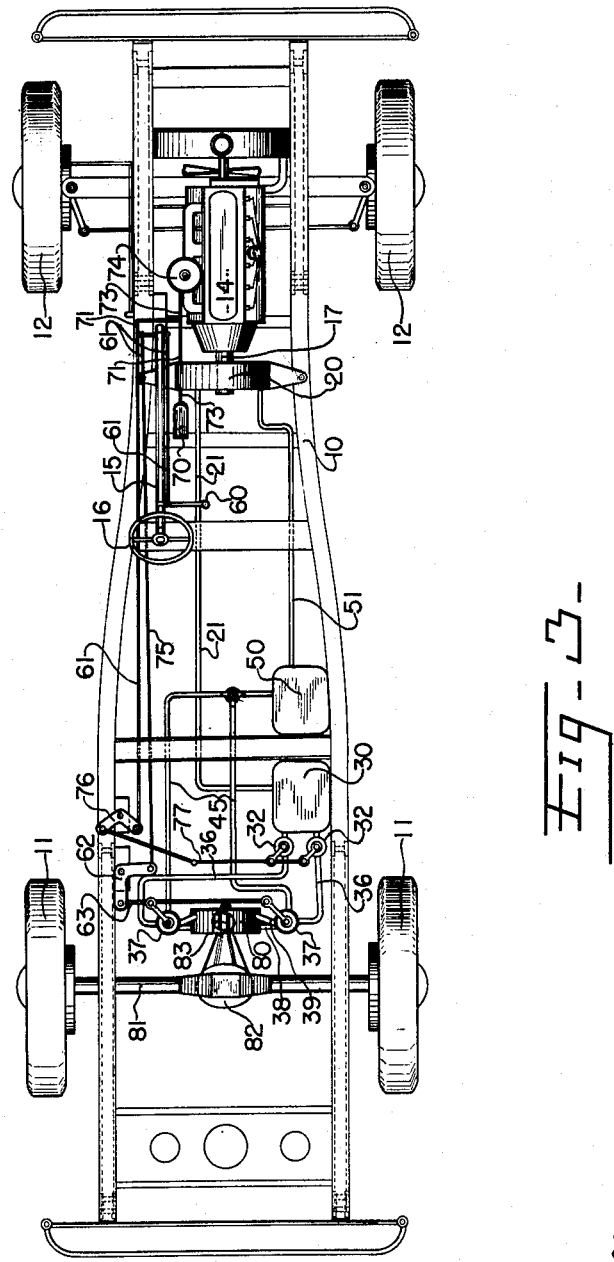

Patented Jan. 20, 1953

2,626,001

UNITED STATES PATENT OFFICE 2,626,001

HYDRAULIC DRIVE FOR MOTOR VEHICLES

John T. Antle, Jr., Louisville, Ky., assignor of one-half to Virginia Devinney, Washington, D. C.

Application February 9, 1949, Serial No. 75,405

2 Claims. (Cl. 180—66)

This invention relates to a hydraulic drive for motor vehicles, and more particularly to a hydraulic drive of the type including an engine driven pump, a hydraulic fluid pressure tank, a hydraulic fluid reservoir, hydraulic motors connected mechanically with the wheels, liquid conduits leading to and from the several units, and control mechanisms.

It is an object of the invention to provide a drive for motor vehicles which eliminates the necessity of transmission gears and gear shifting.

It is another object to provide a drive which is smooth and noiseless in operation.

It is a further object to provide a drive permitting the independent spring suspension of the rear wheels with a resulting improvement in riding comfort.

It is a further object to provide a drive which, though relatively trouble-free, may be easily and conveniently repaired.

It is a further object to provide a hydraulic drive operated by controls in the manner now generally used, that is through the medium of an accelerator pedal and the equivalent of a steering-post-supported gear shift lever.

Other objects will be apparent to those skilled in the art from the following description taken with the appended drawings wherein:

Figure 1 is a top plan view of a motor vehicle, with the body removed, provided with a preferred form of the present invention;

Figure 2 is a side elevational view of the same; and

Figure 3 is a top plan view of a motor vehicle, with the body removed, provided with another form of the invention.

Referring now in greater detail to Figures 1 and 2, a conventional chassis 10 is provided with rear wheels 11, front wheels 12, bumpers 13, power plant 14, steering post 15 and steering wheel 16. The power shaft 17 of the power plant 14 is directly connected to, and operative to drive, a hydraulic pump 20.

Fluid is forced through a pressure conduit 21 to a two-way by-pass valve 22. When the vehicle is being driven, the fluid passes through a pressure conduit 27 to a hydraulic fluid pressure tank 30. Fluid is forced from pressure tank 30 through conduits 31, valves 32, conduits 36 to forward-reverse valves 37. The valves 37 are selectively operated to direct the fluid either through flexible nozzle conduits 38 or through flexible nozzle conduits 39 to the hydraulic fluid motors 40. The motors 40 are of conventional design, each having a housing 41 rigidly secured to the chassis 10 of the vehicle. Each housing 41 has rotatably mounted therein a vaned rotor 41' which is directly connected to the axles 42 of rear wheels 11. Each fluid motor 40 is operative to drive its corresponding wheel 11 independently of the other motor 40 and other wheel 11. The nozzle conduits 38 are so disposed as to direct fluid against the vanes of the rotor below the axle 42, thereby rotating the wheels 11 in such a way as to impart forward motion to the vehicle. The nozzle conduits 39 on the other hand are operative to direct fluid against the vanes on the rotor above the axle and thereby cause a rearward movement of the vehicle.

It is apparent that the valves 37 are operative to control the circulation of fluid through the motors 40 in two different directions, namely, into the motors 40 through nozzle conduits 39 and out of the motor through conduits 38, or, alternatively, to the motors through nozzle conduits 38 and from the motors through nozzle conduits 39. Under either condition, the fluid returning to valves 37 is directed through return conduits 45 to a storage reservoir 50. The hydraulic pump 20 draws fluid from the reservoir 50 through a conduit 51. The path of circulation is thus completed and the fluid is allowed to continuously circulate about the above-described circuit.

In order to provide for a "neutral" condition when the engine is running and the vehicle is stationary, I provide a by-pass circuit. In this circuit the fluid is forced from the pump 20 through the conduit 21, by-pass valve 22, a by-pass conduit 52, into storage reservoir 50 and return conduit 51 back to the pump 20. The by-pass valve 22 therefore has two positions, one for driving the vehicle either in the forward or reverse direction, and another for by-passing the hydraulic fluid when the vehicle is stationary.

I provide manually operated mechanism for controlling the fluid in the system which comprises a hand lever 60 pivotally mounted on the steering post 15 immediately beneath the steering wheel 16. The hand lever 60 corresponds in part to a gear shift lever on the conventional motor vehicle. When the hand lever 60 is manipulated, the motion is transmitted through a linkage mechanism 61 to a bell crank 62. A control rod 63 connects the bell crank with actuating levers 64 of the forward-reverse valves 37. It is therefore apparent that hand lever 60 is movable to operate the valves 37 into either "forward" or "reverse" position to provide for corresponding movements of the vehicle. The hand lever 60 will normally be left in the "forward" position and be moved to the "reverse" position only when the vehicle is to be driven rearwardly.

I also provide a foot pedal 70 corresponding to the accelerator pedal of a conventional motor vehicle. The foot pedal 70 is pivotally mounted on the floor board of the vehicle at 71. Movement of the pedal 70 is transmitted through a link 72 and an accelerator rod 73 to the carburetor 74 of the power plant 14. Movement of pedal 70 simultaneously acts through the link 72 on a connecting mechanism 75, the other end of the mechanism being connected to a bell crank 76. An actuating rod 77 connects the bell crank 76 with the on-off valves 32. Movement of pedal 70 is also simultaneously operative to move a linkage rod 78 which is connected on the other end to an actuating arm 79 of the by-pass valve 22. It is therefore apparent that the foot pedal 70 is so connected as to control three units, namely the carburetor 74, the on-off valves 32 and the by-pass valve 22. The mechanical linkages are so constructed and proportioned as to provide for the proper relative simultaneous movements of the three mentioned units. When the pedal 70 is depressed, the power unit 14 is accelerated; the on-off valves 32 are opened so as to permit the flow of hydraulic fluid from the pressure tank 30 to the fluid motors 40; and, at the same time, the by-pass valve 22 is moved from its "neutral" position to permit the flow of fluid from the pump 20 through conduit 27 to the pressure tank 30.

It is apparent that I have provided a hydraulic drive for a motor vehicle which is easy to operate, has control means actuated by levers which correspond to those commonly employed in motor vehicles, and which is smooth and automatic in operation. The manipulation of the vehicle is remarkably easy. In use the engine is started and if it is desired to move the vehicle forward (the hand lever 60 being normally left in the "forward" position) the foot pedal 70 is merely depressed. When the pedal 70 is released, the power unit 14 is automatically decelerated and the valves 32 and 22 are returned to their "off" and "neutral" positions, respectively. It is obvious that the disadvantages and annoyances attendant the manipulation of the motor vehicle incoporating gear shift means are avoided.

Referring to Figure 3, wherein I show a modified form of the invention, the individual fluid motors 40 connected to corresponding wheels 11 are replaced by a single hydraulic fluid motor 80. In this form of the invention a motor vehicle, having a conventional rear axle 81 and a differential assembly 82, is employed. The rotor 83 of the hydraulic motor 80 is rigidly secured to the pinion shaft of the differential 82. The remaining parts and the operation of this embodiment are the same as those previously described in connection with Figures 1 and 2. No differential is needed in the first-described form because the fluid motors 40 are independent of each other and are each connected to a different one of the rear wheels 11. By this construction the rear wheels are allowed to rotate at different speeds when the vehicle is going around a curve. The form of the invention shown in Figure 3 has a conventional differential 82 for this purpose.

In the form of invention shown in Figures 1 and 2 the rear wheels 11 of the vehicle may be individually suspended by springs 84. Independent vertical movement of the wheels 11 is permitted by reason of said spring suspension and the flexibility of conduits 38 and 39. By this construction both the front and rear wheels are spring mounted, resulting in improved riding comfort and less wear and tear on the vehicle.

While I have shown and described two forms of my invention, it is to be understood that I am not to be limited thereto and that many changes could be made without departing from the scope of the claims hereto appended.

What I claim is:

1. A hydraulic drive for motor vehicles comprising a hydraulic pump and power unit in operative connection, a pressure tank receptive to fluid from the pump, an individual hydraulic motor for each driven wheel, a fluid reservoir, conduits for conveying the fluid through a circuit from the pump to the pressure tank, to the hydraulic motors, to the reservoir and back to the pump, a by-pass conduit for conveying fluid from the pump to said reservoir and back to the pump, on-off valves in the conduits between the pressure tank and the hydraulic motors, a by-pass valve in the by-pass conduit, means operative to simultaneously accelerate the power unit, close the by-pass valve and open the one-off valve, forward-reverse valves in the conduits between the pressure tank and the hydraulic motors, said forward-reverse valves being disposed between the on-off valves and the motors, and a steering-post-mounted lever and linkages therefor operative to control the forward-reverse valves.

2. A hydraulic drive for differential equipped motor vehicles comprising a hydraulic pump directly connected with the vehicle motor, a pressure tank receptive to fluid from the pump, a hydraulic motor connected to the rear wheels of the vehicle through the differential assembly, a fluid reservoir, conduits for conveying the fluid through a circuit from the pump to the pressure tank, to the hydraulic motor, to the reservoir and back to the pump, a by-pass conduit for conveying fluid from the pump to the reservoir and back to the pump, on-off valves in the conduits between the pressure tank and the hydraulic motor, a by-pass valve in the by-pass conduit, foot pedal means operative when depressed to simultaneously accelerate the vehicle motor, close the by-pass valve and open the on-off valve, forward-reverse valves in the conduits between the pressure tank and the hydraulic motor, said forward-reverse valves being disposed between the on-off valves and the motor, and a steering-post-mounted lever and linkages therefor operative to control the forward-reverse valves.

JOHN T. ANTLE, Jr.

REFERENCES CITED

The following references are of record in the file of this patent:

UNITED STATES PATENTS

| Number | Name | Date |
|---|---|---|
| 1,138,667 | Kitchen | May 11, 1915 |
| 1,347,279 | Kraus | July 20, 1920 |
| 2,279,008 | Nathan | Apr. 7, 1942 |
| 2,393,324 | Joy | Jan. 22, 1946 |
| 2,516,662 | Vickers et al. | July 25, 1950 |

FOREIGN PATENTS

| Number | Country | Date |
|---|---|---|
| 364,942 | France | June 13, 1906 |
| 569,567 | France | Jan. 8, 1924 |